(12) United States Patent
Sasaki et al.

(10) Patent No.: US 11,474,751 B2
(45) Date of Patent: Oct. 18, 2022

(54) STORAGE APPARATUS AND DATA PROCESSING METHOD THEREFOR

(71) Applicant: Hitachi, Ltd., Tokyo (JP)

(72) Inventors: Kosuke Sasaki, Tokyo (JP); Shinichi Kasahara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/471,953

(22) Filed: Sep. 10, 2021

(65) Prior Publication Data

US 2022/0269415 A1    Aug. 25, 2022

(30) Foreign Application Priority Data

Feb. 25, 2021    (JP) .............................. JP2021-028589

(51) Int. Cl.
*G06F 3/06* (2006.01)
(52) U.S. Cl.
CPC ............ *G06F 3/067* (2013.01); *G06F 3/0604* (2013.01); *G06F 3/0655* (2013.01)
(58) Field of Classification Search
None
See application file for complete search history.

(56) References Cited

U.S. PATENT DOCUMENTS

2001/0014929 A1* 8/2001 Taroda .................. G06F 3/0676
                                                            711/112
2015/0339184 A1    11/2015 Kasahara

FOREIGN PATENT DOCUMENTS

WO    2014/115277 A1    7/2014

* cited by examiner

*Primary Examiner* — Brian R Peugh
(74) *Attorney, Agent, or Firm* — Volpe Koenig

(57) ABSTRACT

A storage apparatus configures a second transfer unit of data based on a zHL read request from a transfer unit of data based on a fiber connect read request, calculates a warranty code for the data of the second transfer unit, stores the data and the warranty code in a memory; after receiving a read request based on zHL, transfers the data together with the warranty code to a host computer if it is determined that the data of the second transfer unit, which is a target of the read request, exists in the memory; and sends a notice of an error of the read request to the host computer when the data of the second transfer unit, which is the target of the read request based on zHL, does not exist in the memory, wherein the host computer which has received the notice outputs a read request.

8 Claims, 8 Drawing Sheets

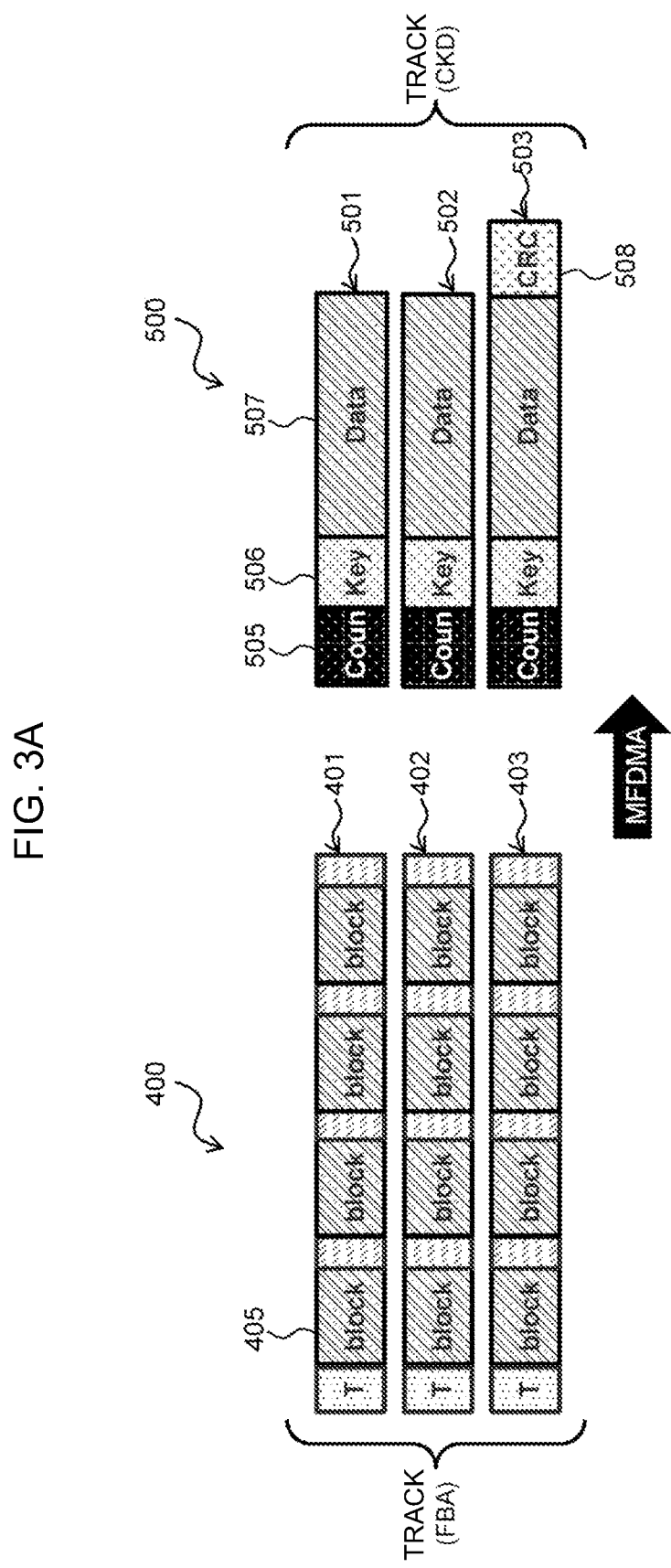

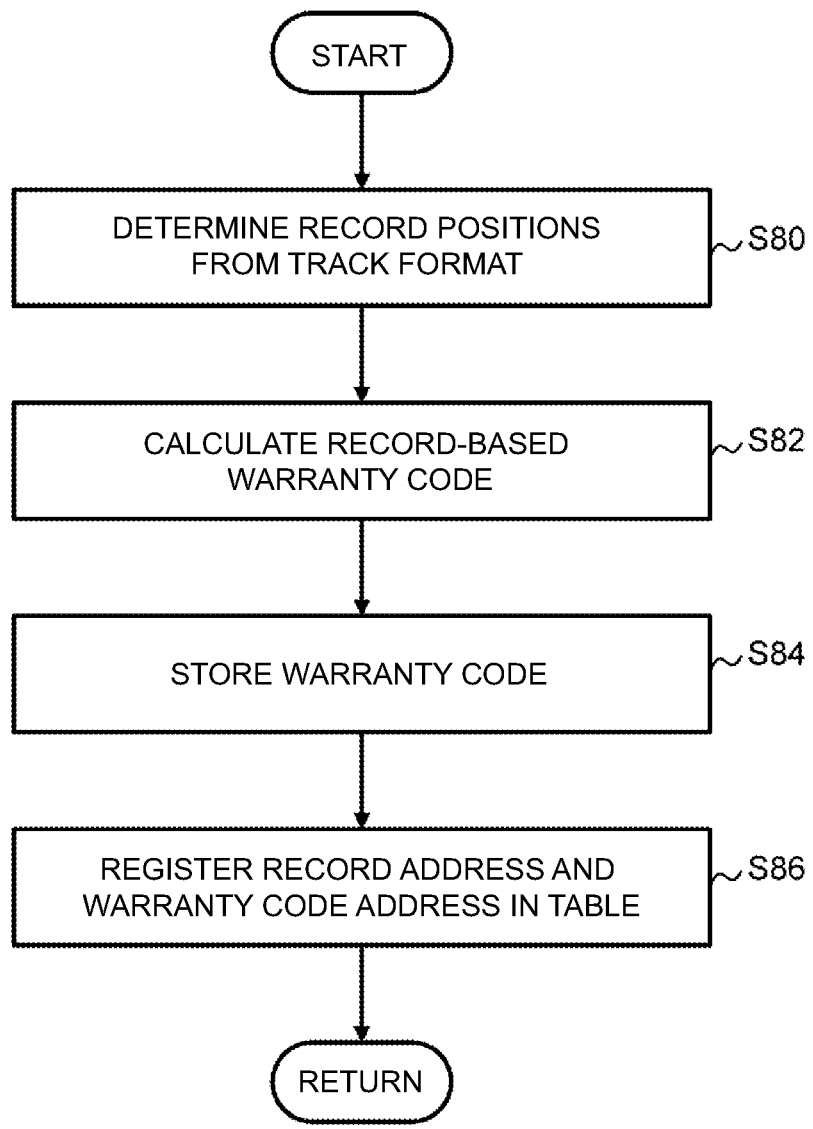

STORAGE APPARATUS AND DATA PROCESSING METHOD THEREFOR

TECHNICAL FIELD

The present invention relates to a storage apparatus which transmits/receives information to/from a host computer via a network, and a data processing method for the storage apparatus.

BACKGROUND ART

In a storage system where a host computer and a storage apparatus are connected via a network, FICON (Fibre Connect) and HPF (High Performance) are known as examples of an interface controller that connects a mainframe to an auxiliary storage apparatus.

In addition, new interface controllers have been developed that increase application response speed compared to existing interfaces by improving the performance of data access between a mainframe and a storage apparatus. Z Hyper Link (hereinafter referred to as "zHL") exists as a protocol of this kind.

A host computer generates a read request based on an interface controller and transmits it to a storage apparatus, and a DMA controller in the storage apparatus adds an error detection code, for example, a Cyclic Redundancy Check code (CRC), to read data for each data transfer unit, and transfers the read data to the host computer (WO 2014/115277).

CITATION LIST

Patent Literature

PTL 1: WO 2014/115277

SUMMARY OF THE INVENTION

Problems to be Solved by the Invention

In a storage system where a host computer and a storage apparatus are connected via a network, when the host computer requests data from the storage apparatus, it outputs a read request to the storage apparatus. When this takes place, depending on the host computer, the read request may sometimes be generated using a different protocol. For example, in a read request generated by using a protocol for use with zHL, record-based data may be requested as read data, while in a read request generated by using a protocol for use with FICON, track-based data may be requested. In this case, for read requests with different protocols, in order to transmit the read data specified in each read request to the request source, the storage apparatus is required to absorb the differences between the protocols and to respond quickly to the read requests.

It is an object of the present invention to absorb differences in protocol in read requests with different protocols and respond quickly to the read requests.

Means to Solve the Problems

In order to achieve the above-described object, there is provided according to an aspect of the present invention is a storage apparatus for processing a read request from a host computer to the storage apparatus, wherein the storage apparatus includes: an interface controller that controls data transfer between the host computer and the storage apparatus; a data processing controller that controls reading of target data of the read request and transfer of the read data; and a memory for temporary storage of the read data, wherein the host computer executes at least two types of interface protocols for the read request; wherein the data processing controller stores the data, which is read according to a read request of a first interface protocol, in the memory; wherein the interface controller and/or the data processing controller configure a second transfer unit of data based on a read request of a second protocol from a first transfer unit of data based on the read request of the first interface protocol, calculate a warranty code for the data of the second transfer unit, and store the data of the second transfer unit and the warranty code in the memory; and wherein after receiving a read request according to the second interface protocol, if the interface controller determines that the data of the second transfer unit, which is a target of the read request, exists in the memory, the interface controller transfers the data together with the warranty code to the host computer; and if the interface controller determines that the data of the second transfer unit, which is the target of the read request according to the second interface protocol, does not exist in the memory, the interface controller sends a notice of an error of the read request to the host computer and the host computer which has received the notice outputs a read request according to the first interface protocol to the interface controller.

Advantageous Effects of the Invention

The present invention can absorb differences in protocol in read requests with different protocols and respond quickly to the read requests.

BRIEF DESCRIPTION OF THE DRAWINGS

FIG. 3A is a first block diagram that illustrates FBA data/CKD data conversion performed by the DMA controller (MFDMA);

FIG. 8 is a flowchart for generating a record data warranty code from track data.

DESCRIPTION OF THE EMBODIMENTS

Figure 1:
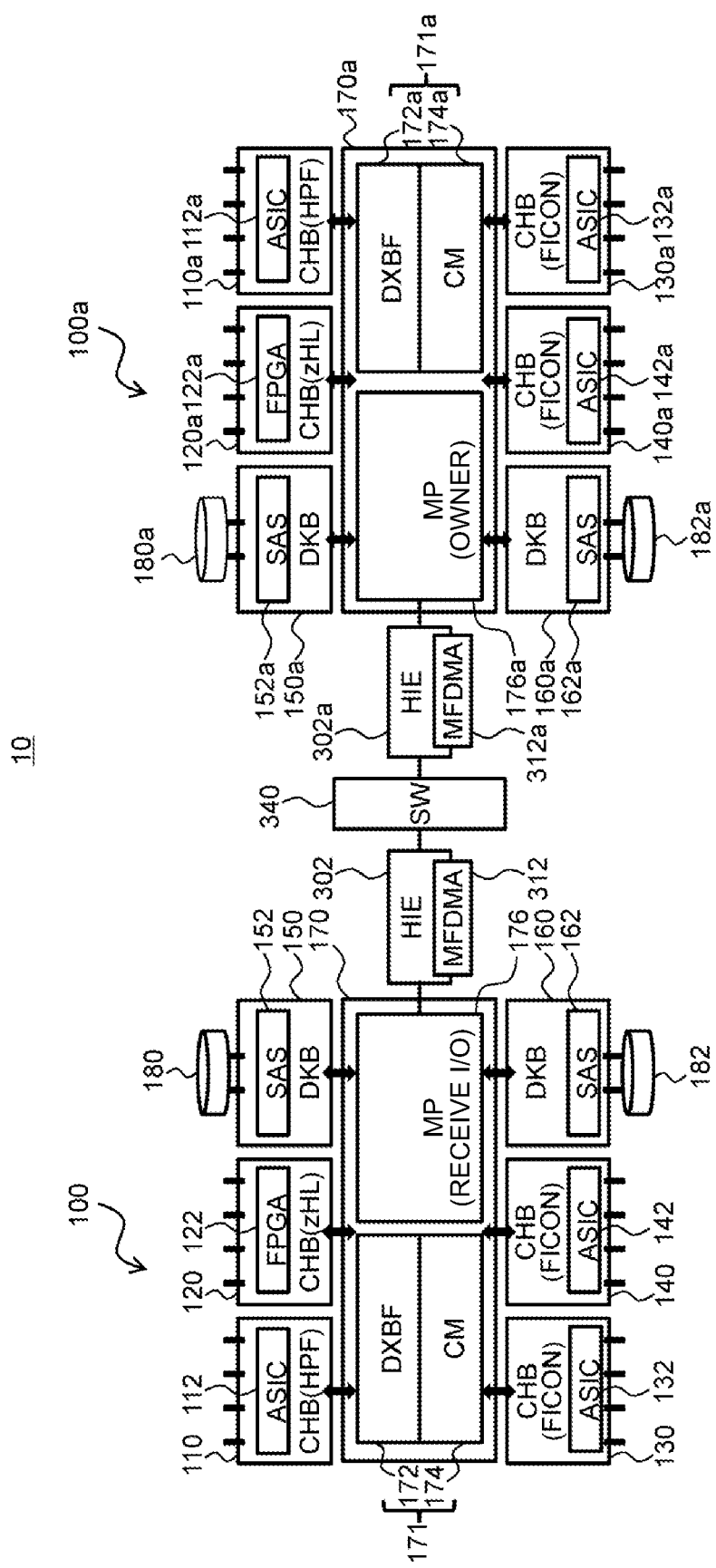
FIG. 1 is a hardware block diagram of an embodiment of a storage apparatus connected to a host computer that has been omitted in this drawing.

FIG. 1 is a hardware block diagram of an embodiment of a storage apparatus connected to a host computer that has been omitted in this drawing. In FIG. 1, a storage apparatus 10 has, as multi-nodes, a first node 100 and a second node 100a, and each of the nodes 100 and 100a is connected to the other through a switch 340 positioned between them.

An HIE 302 is a channel module that connects the switch 340 to a control board 170 of the first node 100, with one end connected to an MP (microprocessor) 176 of the control board 170 and the other end connected to the switch 340. The HIE 302 also is equipped with an MFDMA 312 as a DMA (Direct Memory Access) controller. The switch 340 is a network device that makes connections between buses, and is configured to include, for example, a Fibre-Channel, Ethernet (registered trademark), LAN (Local Area Network) or other such communication network device.

The first node 100 includes the control board 170, CHBs (channel adapters) 110, 120, 130, and 140 that control communication between the control board 170 and the host computer, and DKBs (disk adapters) 150 and 160 that control communication between storage devices 180 and 182.

The CHB 110 includes an ASIC 112 as an interface controller that processes HPF-based commands from the host computer. The CHBs 130 and 140 include ASICs 132 and 142, respectively, as interface controllers to process commands based on FICON from the host computer. The CHB 120 has an FPGA 122 as an interface controller that processes commands based on zHL from the host computer. Since the physical layer of FICON is Fibre Channel, while the physical layer of zHL is Infiniband, separate channel adapters/channel boards exist for each of the interface protocols, including HPF.

ZHL is an interface that provides high-speed connection between a mainframe and a storage apparatus via an optical fiber, and the use of this interface improves the performance of data access and enables dramatic acceleration of application response speeds compared to existing interfaces such as FICON and HPF. ZHL uses an Infiniband interface for its physical layer, and PCIe as its protocol. ZHL manages Mailbox and Status areas as credits, and transfers them with Mem WR. With respect to data I/O, read data (Read) is transferred by Mem WR, and write data (Write) is transferred by Mem Read.

Since a target value of response performance required by zHL is 20 μs, which is expected to be reduced from 15 to ⅓ compared to FICON and HPF, the storage apparatus caches data that may be subject to read requests in a memory in CKD format in advance. Then, the storage apparatus reads, from an auxiliary storage apparatus (storage), data from an area in the neighborhood of a storage area accessed by a read request using a non-zHL command, and caches it in advance in a cache memory or in a temporary storage memory such as a buffer memory. When the CHB 120 receives a read command based on zHL from the host computer, the controller 122 of the CHB transfers the cached data to the host computer, and thereby avoids activation of the DMA controller and improves the performance of the response from the storage apparatus to the host computer.

While aiming for an improvement in the performance of the response to read commands based on zHL, the inventors focused on databases, and taking into account the fact that even in random access there is a demand for subsequent access to areas neighboring the storage areas for data to which there has been an access request based on F ICON, etc., discovered that the response to a read command based on zHL can be improved by prefetching the data in such neighboring areas and caching the prefetched data in the memory before receiving a command based on zHL.

The DKBs 150 and 160 are respectively equipped with SAS (Serial Attached SCSI), which are input/output interfaces 152 and 162 for input/output of data with the storage devices 180 and 182 as auxiliary storage apparatuses. Each of the storage devices 180 and 182 includes, for example, one or a plurality of NVMe (Non-Volatile Memory express), SSD (Solid State Drive), and HDD (Hard Disk Drive).

The control board 170 includes a DIMM (Dual Inline Memory Module) 171 and a microprocessor (MP) 176. The DIMM 171 includes, as a memory for temporary storage: an area where data transferred to and from the host computer is cached (DXBF: transfer buffer) 172, and an area where data transferred to and from a recording device is cached (CM: cache memory) 174.

The MP 176 functions as a control unit that carries out integrated control of the entire first node 100 according to a microprogram, and when it receives a read request or a write request (which will be sometimes collectively referred to as an I/O (Input/Output) request) from the host computer, it executes processing to transfer the I/O request via the switch 340 to an owner MP 176a of the second node 100a, or executes processing for data input/output to/from the storage devices 180 and 182.

The second node 100a is configured in the same way as the first node 100. For the plurality of constituent elements in the second node 100a, those that are the same as the constituent elements in the first node 100 are marked with the same number and have had their descriptions omitted. However, the constituent elements of the second node 100a will be distinguished from the constituent elements of the first node 100 by the addition of the letter "a" after the relevant number.

The MP 176a of the second node 100a is shown as an MP (owner) because the MP 176a has the authority to process data I/O requests from a specific host computer connected via the CHB of the first node 100. To differentiate it from this, the MP 176 of the first node 100 is shown as MP (receive I/O).

The host computer communicates with the storage apparatus via zHL or some other interface (e.g., FICON). The following is a description of operations of the host computer transmitting a read request to the first node 100 via FICON. When the CHB 130 (or the CHB 140) receives a read command from the mainframe, the ASIC 132 (or the ASIC 142) determines the owner MP and notifies the MP 176a, which is the owner MP, of the read command.

When the owner MP 176a receives this notification, it activates the MFDMA 312a. The MFDMA 312a also has a function to convert read data consisting of fixed lengths in FBA format in the cache memory 174a to CKD (variable lengths), and transfers the converted data to a DXBF 172 of a DMMA 171. The MP 176a notifies the CHB 130 that received the read command of this transfer. The ASIC 132 of the CHB 130, upon receipt of this notification, transfers the read data to the host computer, and then notifies the owner MP 176a of the completion of the transfer of the read data, thereby enabling the owner MP 176a to determine that the read request processing has ended.

When the host computer transmits a read request to the first node 100 on the basis of zHL, the FPGA 122 of the CHB 120 that receives the read command: transfers read target data to the host computer if the read target data exists in the DXBF 172; and sends a hit error notice to the host computer if the read target data does not exist in the DXBF 172. When the host computer receives the hit error notice, it issues the read command again based on FICON.

Figure 2:
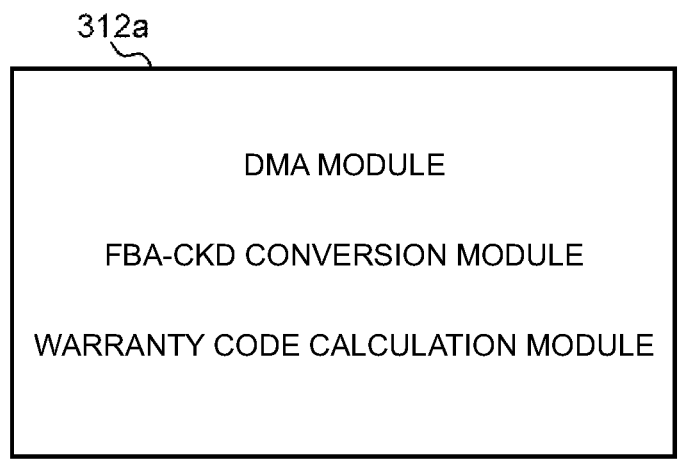
FIG. 2 is a functional block diagram of an MFDMA (DMA controller)

FIG. 2 shows a functional block diagram of the MFDMA 312a. The MFDMA 312a includes a DMA module that transfers data for the read command based on a command from the MP 176a, a module that converts FBA format data read from the storage device to CKD format data for the mainframe, and a module that calculates a warranty code for each data transfer unit. A module is a function achieved by a program and/or hardware, and may be rephrased using other terms such as means, circuit, function, unit, or part.

A non-zHL read command based on FICON, HPF, etc., will cause the MP 176a to access the storage devices 180a and 182a when there is no read target data in the DXBF 172. For such a command, the DMA controller (MFDMA 312a) transfers data mainly in track units. Meanwhile, as zHL focuses on the database and improves the responsiveness of the storage apparatus, it mainly performs data transfer in record units.

Figure 3B:
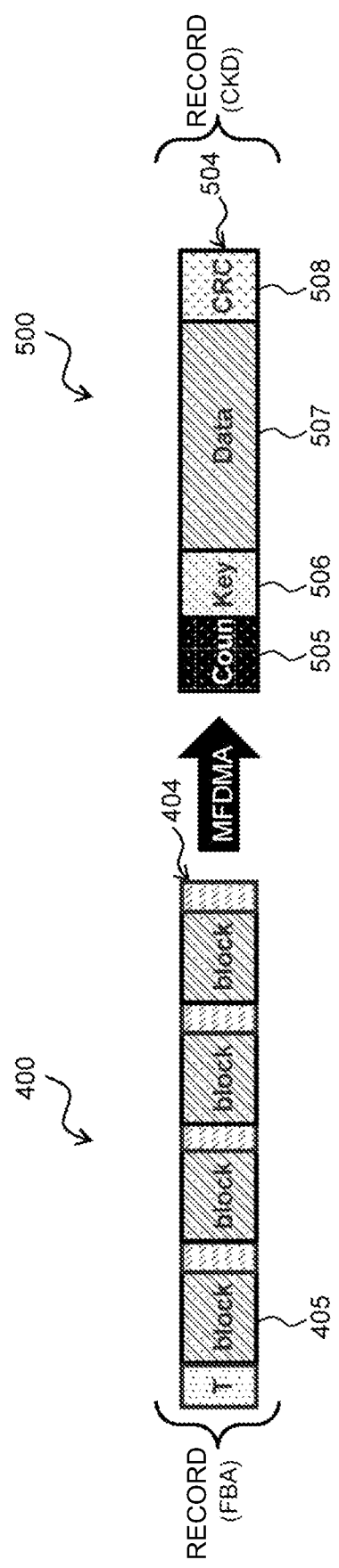
FIG. 3B is a second block diagram that illustrates the FBA data/CKD data conversion performed by the DMA controller (MFDMA)

FIG. 3A and FIG. 3B are block diagrams for explaining the conversion between FBA data and CKD data executed by the DMA controller (MFDMA: 312a). With the read command, reading of data from the storage device is performed in track units consisting of a plurality of records (FIG. 3A). During data transfer, the MFDMA converts FBA data into CKD data for each transfer unit, i.e., for each track unit, and also calculates the warranty code (CRC) and adds the warranty code to each data transfer unit. FIG. 3A shows that a warranty code 508 has been added to the end of track-based data.

In FIG. 3A, a fixed length (FBA) transmission format 400 is configured to include a track that consists of a set of a plurality of pieces of record data, e.g., a plurality of records 401, 402, 403. Each of the records 401-403 is configured to include a set of a plurality of data blocks 405.

A variable length (CKD) transmission format 500 is configured to include a track that consists of a set of a plurality of pieces of record data, e.g., a plurality of records 501, 502, 503. Each of the records 501-503 is configured to include a count area 505, a key area 506, and a data area 507. In the count area 505, information such as record number, data length, and key length is stored. In the key area 506, information such as data labels (keywords) is stored. In the data area 507, read data is stored.

FIG. 3B shows data transfer being executed in record units by means of a read command, and the conversion of fixed length (FBA) read data into variable length (CKD) data. The MFDMA generates a CRC 508 based on the record data and attaches it to the end of the record.

Figure 4:
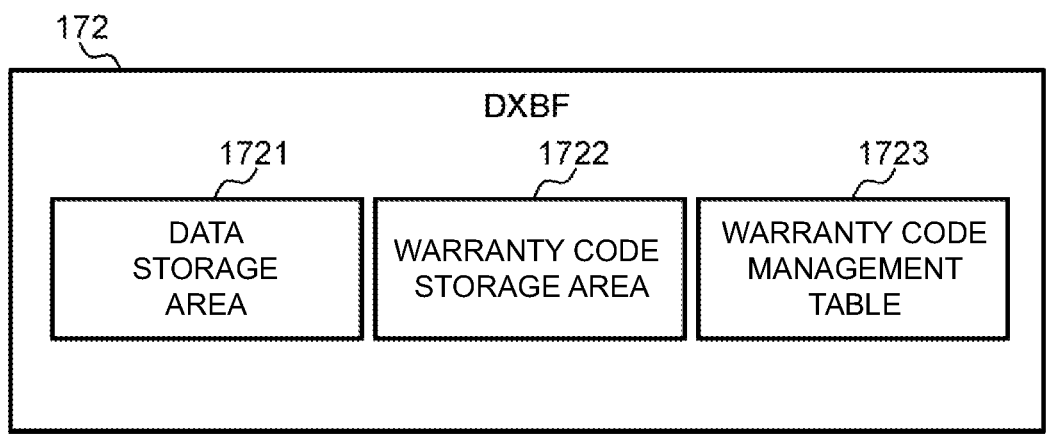
FIG. 4 is a functional block diagram of a DXBF (temporary recording memory) and is also a configuration diagram of a track warranty code management table according to a first embodiment of the present invention.

FIG. 4 is a functional block diagram of the DXBF 172. The DXBF 172 includes a storage area 1721 for storing data read from the storage device (data based on read commands, and prefetched data), an area 1722 for storing the warranty code for these data, and a storage area 1723 for storing a management table (management information) for managing warranty codes. The warranty code management table 1723 includes a management table for track-based warranty codes and a management table for record-based warranty codes.

As described earlier, since the interface between the host computer and the storage apparatus handles a plurality of protocols, there may be differing transfer units for read data among the plurality of protocols, and as a result, there may be differing ranges for warranty codes generated from the data of the transfer units. For example, the reading of data and transfer of data based on a FICON read command are in track units, while the same actions based on zHL are in record units.

In this case, the CHB 120 which has received a read command based on zHL from the host computer cannot directly transfer the data cached in the DXBF 172 of the storage controller 170 to the host computer. This is because the warranty code of the relevant data is one created based on track-based data, and not a warranty code created in record units as required by zHL. On the other hand, when a zHL-based read request is applied to the storage apparatus, if the MP 176a activates the MFDMA 312a to recalculate the track-based warranty code into record units, the CHB 120 cannot respond to the host computer with read data within the response value range specified for zHL.

Therefore, the storage apparatus recalculates and stores the warranty code of prefetched data associated with a read command based on a first protocol before receiving a read command based on a second protocol, and transfers the prefetched data to the host computer together with the recalculated warranty code when receiving the read command based on the second protocol. The first protocol may be FICON, with the read unit of tracks, and the second protocol may be zHL, with the read unit of records.

Figure 5:
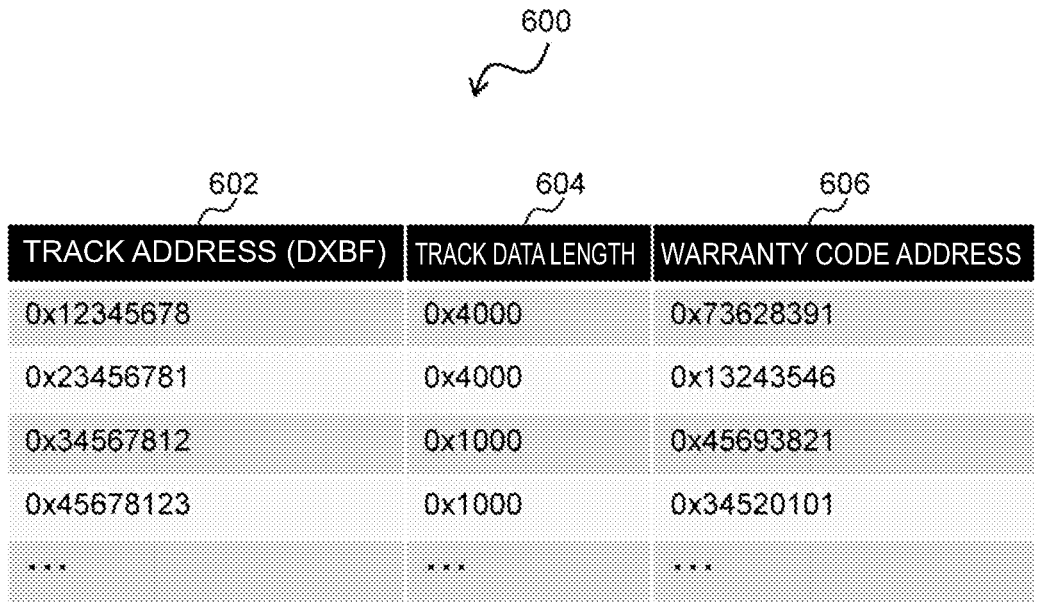
FIG. 5 is an example of a track data warranty code management table.

FIG. 5 is an example of a track data warranty code management table 600 (FIG. 1: 1723). The track data warranty code management table 600: is a table for managing track-based data that is the target of a read request and track-based data that is the target of prefetching and stored in a separate track near the track that is the target of the read request, by associating them with their respective warranty codes; and includes an address 602 in the DXBF for the track data, a track data length 604, and a warranty code address (DXBF) 606.

The track address 602 is an identification number that uniquely identifies the storage destination (DXBF address) of data belonging to the relevant track. The track data length 604 is information that indicates the length of the data belonging to the track. The track data length 604 stores, for example, the information "0x4000." The warranty code address 606 is an identification number that uniquely identifies the storage destination (DXBF address) of the track-based warranty code, which is calculated from the data belonging to the track. The warranty code address 606 stores, for example, the information "0x73628391."

Figure 6:
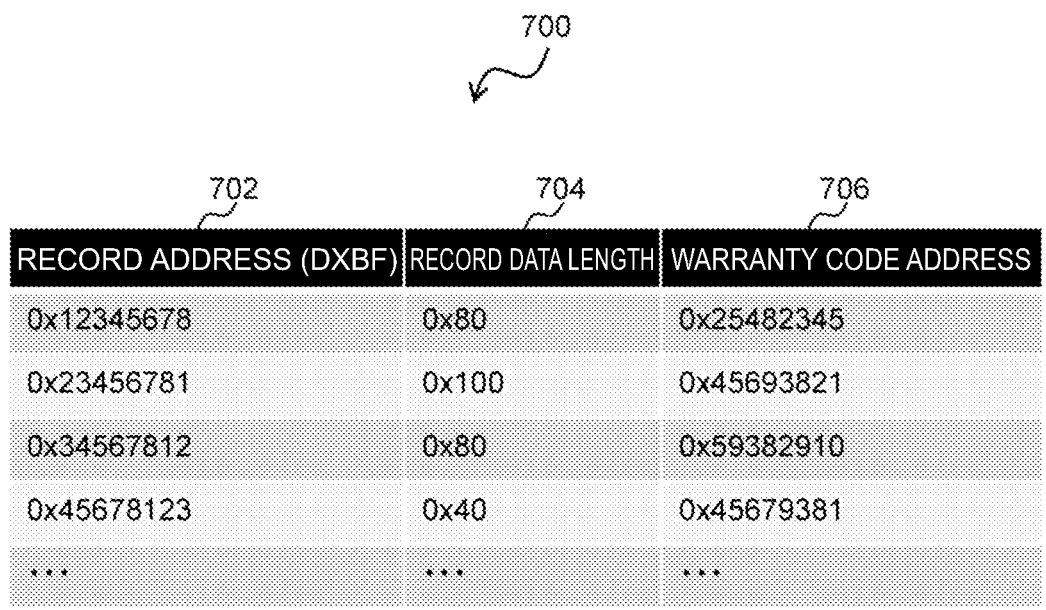
FIG. 6 is an example of a record data warranty code management table.

FIG. 6 is an example of a record data warranty code management table 700 (FIG. 1: 1723). The management table 700 is a table for associating and managing record data and warranty codes, and includes a record data (DXBF) address 702, record data length 704, and a DXBF address 706 where a warranty code calculated based on the record data is stored.

The record data address 702 is an identification number that uniquely identifies the storage destination (address) of data belonging to the relevant record. The record address 702 stores, for example, the information "0x12345678." The record data length 704 is information that indicates the length of the data belonging to the record. The record data length 704 stores, for example, the information "0x80." The warranty code address 706 is an identification number that uniquely identifies the storage destination of the record-based warranty code. The warranty code address 706 stores, for example, the information "0x25482345."

Figure 7:
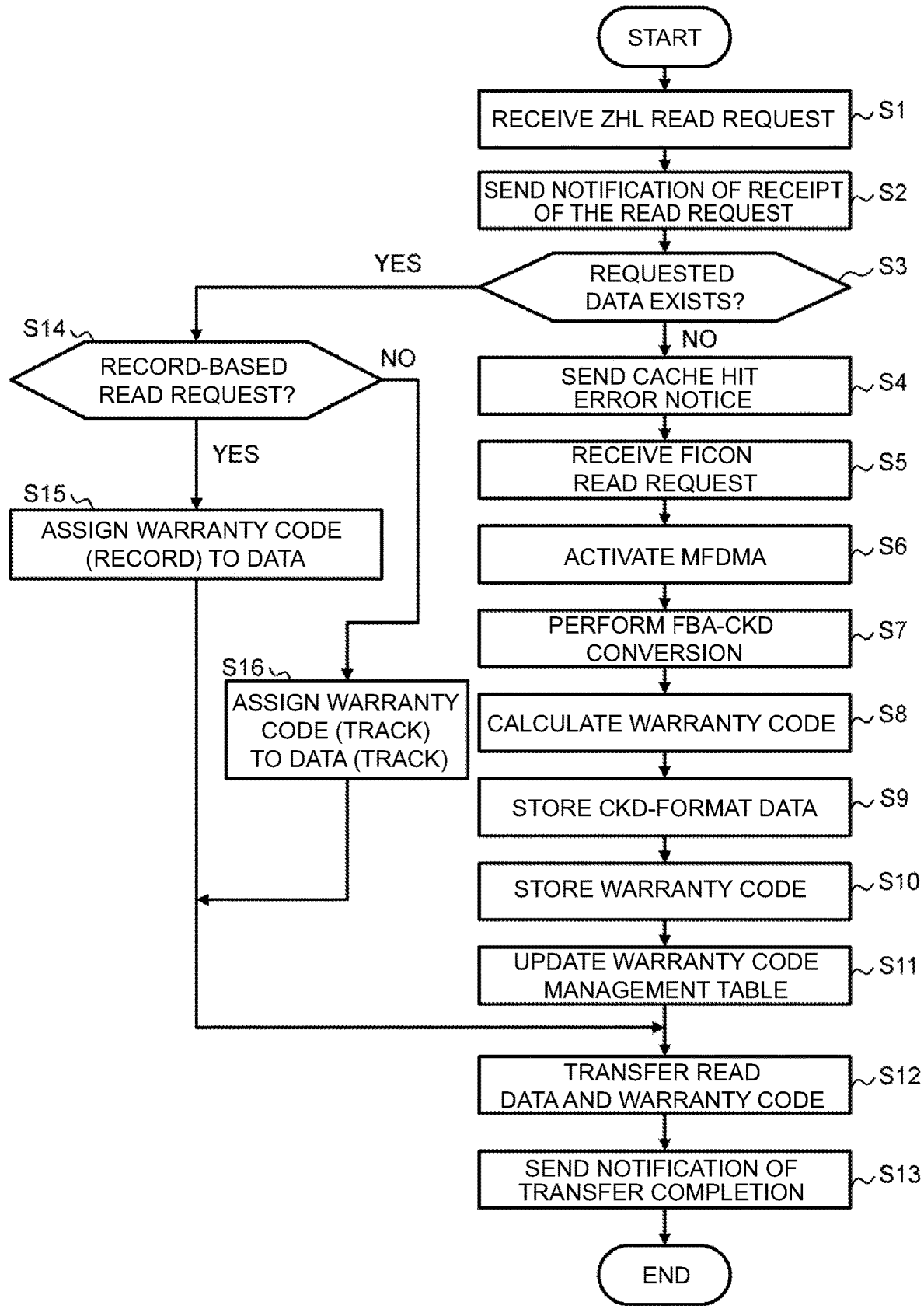
FIG. 7 is a flowchart illustrating operations of the storage apparatus when a read request is transmitted from the host computer.

Next, an explanation will be provided, based on the flowchart illustrated in FIG. 7, about the operations of the storage apparatus when a read request is transmitted from the host computer. When the host computer transfers read requests to the storage apparatus, it gives priority to zHL-based commands over other interface controller-based commands. When the FPGA 122 of the CHB 120 of the storage controller receives a zHL-based read request (the aforementioned second read command) from the host computer (S1), the FPGA 122 notifies the MP 176a of the receipt (S2).

Next, the FPGA 122 determines whether or not the data pertaining to the read request exists in the storage area 1721 of the DXBF 172 by referring to, for example, the management tables illustrated in FIGS. 5 and 6 (S3). If the FPGA 122 makes a negative determination that the data does not exist, it notifies the host computer of a cache hit error (S4). When the host computer receives this notification, it issues a read request based on FICON.

When the ASIC 132 (or ASIC 142) of the CHB 130 (or CHB 140) receives the read command based on FICON (S5), it notifies the MP 176a of the receipt. Upon receiving this notification, the MP 176a activates the MFDMA 312a (S6). The MFDMA 312a converts the read data for the read request staged in the cache memory (CM 174a) using the MP 176a, and the data prefetched as described earlier using the prefetching function of the MP 176a (both being data in FBA format) into data in CKD format (S7). The MFDMA 312a then also calculates the warranty code for each data read unit, that is, each data transfer unit (S8).

Next, the MFDMA 312a stores the read data and the prefetched data in the data storage area 1721 of the DXBF 172 (S9). The MFDMA 312a then calculates the warranty code and stores it in the warranty code storage area 1722 of the DXBF 172 (S10). Furthermore, the MFDMA 312a updates the warranty code management table 600 or 700 based on the calculated warranty code (S11).

Upon receipt of the read command based on FICON from the host computer, the ASIC 132 (or ASIC 142) of the CHB 130 (or CHB 140) receives a transfer notice from the MP 176a, i.e., a notice of the transfer of the data and the warranty code to the DXBF 172 by the MFDMA 312a, obtains the read data from the data storage area 1721 of the DXBF 172, also obtains the warranty code for the read data from the warranty code storage area 1722 by referring to the WWCD management table 600 or 700, and transfers the read data and the warranty code to the host computer (S12). The ASIC 132 (or ASIC 142) of the CHB 130 (or CHB 140) then notifies the owner MP 176a of the completion of that transfer to the host computer (S13) and terminates the flowchart.

When receiving the read command based on zHL from the host computer, the FPGA 122 of the CHB 120 determines, after a positive determination in step S3, whether or not the read request is in record units (S14). If the FPGA 122 makes a positive determination, it obtains the prefetched data from the data storage area 1721 of the DXBF 172, then also refers to the record data warranty code management table 700 to refer to the storage destination address for the warranty code for that data, reads the warranty code from the warranty code storage area 1722 and adds it to the prefetched data (S15), and transfers it to the host computer (S12).

If the FPGA 122 makes a negative determination in S14, it obtains the prefetched data from the data storage area 1721 of the DXBF 172, and further refers to the track data warranty code management table 600 to read the warranty code from the warranty code storage area 1722 based on the warranty code storage destination address of the relevant data, attaches it to the prefetched data (S16), and transfers them to the host computer (S12).

The controller (FPGA 122) of the CHB 120, which has received the read command based on zHL from the host computer, implements a warranty code adjustment means. This will be explained based on the flowchart in FIG. 8. FIG. 8 is a flowchart for generating a record data warranty code from track data. The FPGA 122 repeatedly executes this flowchart every set time.

The FPGA 122 checks for updates to the track data warranty code management table 600 and determines the location of a record based on the track address and track length in the updated track format, and also based on each of the plurality of records contained in the updated track (S80).

Based on the location of the record, the FPGA 122 reads the record data by referring to the data storage area 1721 and calculates a record-based warranty code (S82). The FPGA 122 stores the calculated warranty code in the warranty code storage area 1722 (S84). Next, the FPGA 122 registers the DXBF address of the record data and the DXBF address of the warranty code in the record data warranty code management table 700 (S86), and returns to the start of the flowchart. The flowchart in FIG. 8 may also be executed by the MP 176a.

Even if the target record of the read request based on zHL is present in the data storage area 1721 of the DXBF 172 as part of a track as a result of the aforementioned prefetching, the data of the target record cannot be returned to the host computer unless the warranty code corresponding to the target record is present in the warranty code storage area 1722 of the DXBF 172. In such case, the FPGA 122 will respond to the host computer with a cache hit error (S3 in FIG. 7: NO).

Meanwhile, if the FPGA 122 notifies the MP 176a of the cache hit error and activates the MFDMA 312a in an attempt to calculate the warranty code of the record data in the track, the response value (response time limit) specified for zHL cannot be observed and a timeout will occur. Accordingly, the FPGA 122 calculates the warranty code of the record in the track by executing the flowchart in FIG. 8 before the read request based on zHL for the prefetched data comes from the host computer. Therefore, there is no need to activate the MFDMA 312a for the next read request, and the response value specified for zHL can be observed.

The present invention is not limited to the aforementioned embodiments, and includes various variations and equivalent configurations within the gist of the scope of the appended claims. The aforementioned embodiments are for providing a detailed explanation of the present invention in order to make it easier to understand, and the present invention is not necessarily limited to an embodiment(s) including all the described configurations. For example, FIG. 1 describes a multi-node storage apparatus; however, the present invention is not limited to this example and can also be applied to a single-node storage apparatus.

Each of the aforementioned configurations and functions, etc., may be realized in whole or in part by hardware, for example, through the design of an integrated circuit, or by software, through having a processor interpret and execute a program that realizes the respective functions.

The programs, tables, files, and other information that realize each function can be stored in a storage device such as a memory, hard disk, or SSD (Solid State Drive), or other storage media such as an IC (Integrated Circuit) card, SD card, or DVD (Digital Versatile Disc).

REFERENCE SIGNS LIST

10: storage apparatus
176a: MP (microprocessor)
312: DMA (Direct Memory Access): MFDMA2 as a controller CHA 130, 140, ASIC 132, 142: interface controllers for processing read requests based on the first interface protocol (FICON)

CHB 120, FPGA 122: interface controllers for processing read requests based on the second interface protocol (zHL)

180, 182: storage devices 180, 182

DIMM (Dual Inline Memory Module) 171, DXBF 172: temporary recording memories

The invention claimed is:

1. A storage apparatus for processing a read request from a host computer to the storage apparatus, the storage apparatus comprising:

an interface controller that controls data transfer between the host computer and the storage apparatus;

a data processing controller that controls reading of target data of the read request and transfer of the read data; and a memory for temporary storage of the read data, wherein the host computer executes at least two types of interface protocols for the read request;

wherein the data processing controller stores the data, which is read according to a read request of a first interface protocol, in the memory;

wherein the interface controller and/or the data processing controller configure a second transfer unit of data based on a read request of a second protocol from a first transfer unit of data based on the read request of the first interface protocol, calculate a warranty code for the data of the second transfer unit, and store the data of the second transfer unit and the warranty code in the memory; and wherein after receiving a read request based on the second interface protocol, if the interface controller determines that the data of the second transfer unit, which is a target of the read request, exists in the memory, the interface controller transfers the data together with the warranty code to the host computer; and if the interface controller determines that the data of the second transfer unit, which is the target of the read request based on the second interface protocol, does not exist in the memory, the interface controller sends a notice of an error of the read request to the host computer and the host computer which has received the notice outputs a read request based on the first interface protocol to the interface controller.

2. The storage apparatus according to claim 1, wherein the first transfer unit of the data based on the read request of the first interface protocol is a track including a plurality of records; and wherein the second transfer unit of the data based on the read request of the second protocol is a record.

3. The storage apparatus according to claim 1, wherein the data processing controller includes an MP and a DMA controller;

wherein the DMA controller:

is activated by the MP;

changes the data, which has been read according to the read request of the first interface protocol, from an FBA format to a CKD format and calculates the warranty code for each piece of the data of the first transfer unit; and stores the data, which has been changed to the CKD format, and the warranty code in the memory; and wherein according to a notice from the MP, the interface controller transfers the data that is changed to the CKD format, and the warranty code for each piece of the data of the first transfer unit, which are stored in the memory, to the host computer as a response to the read request based on the first interface protocol.

4. The storage apparatus according to claim 1, wherein the memory includes:

an area for storing data which is read from a recording device;

an area for storing a warranty code calculated for the data; and a storage area for management information for managing the warranty code by distinguishing between the first transfer unit and the second transfer unit.

5. The storage apparatus according to claim 1, wherein a response time limit is set to the read request based on the second interface protocol.

6. The storage apparatus according to claim 1, wherein the data processing controller prefetches data in an area in a vicinity of a target storage area of the read request based on the first interface protocol and stores the prefetched data in the memory; and wherein the interface controller outputs target data of the read request, among the prefetched data, from the memory to the host computer in response to the read request based on the second interface protocol.

7. The storage apparatus according to claim 1, wherein the first transfer unit is a tract including a plurality of records or is a record;

wherein the data processing controller includes a DMA controller; and wherein the DMA controller:

generates the warranty code on the basis of data included in the track if the first transfer unit is the track; and generates the warranty code on the basis of data included in the record if the first transfer unit is the record.

8. A data processing method for a storage apparatus to process read requests based on at least two types of interface protocols from a host computer, wherein the storage apparatus:

stores data which is read according to a read request of a first interface protocol;

configures a second transfer unit of data based on a read request of a second protocol from a first transfer unit of data based on the read request of the first interface protocol, calculates a warranty code for the data of the second transfer unit, and stores the data of the second transfer unit and the warranty code;

after receiving a read request based on the second interface protocol, transfers the data together with the warranty code to the host computer if it is determined that data of the second transfer unit, which is a target of the read request, is stored; and sends a notice of an error of the read request to the host computer if it is determined that the data of the second transfer unit, which is the target of the read request based on the second interface protocol, is not stored; and wherein the host computer which has received the notice outputs a read request based on the first interface protocol.

* * * * *